(12) United States Patent
Dong et al.

(10) Patent No.: US 8,223,335 B2
(45) Date of Patent: Jul. 17, 2012

(54) SYSTEM FOR ALIGNMENT MEASUREMENT FOR ROLLING EMBOSSED DOUBLE-SIDED OPTICAL FILM AND METHOD THEREOF

(75) Inventors: Shu-Ping Dong, Taichung County (TW); Hung-Ming Tai, Hsinchu (TW); Fu-Shiang Yang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 443 days.

(21) Appl. No.: 12/571,961

(22) Filed: Oct. 1, 2009

(65) Prior Publication Data
US 2010/0140312 A1 Jun. 10, 2010

(30) Foreign Application Priority Data
Dec. 4, 2008 (TW) ................................ 97147100 A

(51) Int. Cl.
*G01B 11/00* (2006.01)
(52) U.S. Cl. ........................................................ 356/401
(58) Field of Classification Search ........................ None
See application file for complete search history.

(56) References Cited

U.S. PATENT DOCUMENTS

| | | | |
|---|---|---|---|
| 3,796,497 A * | 3/1974 | Mathisen et al. | 356/139.07 |
| 5,555,800 A * | 9/1996 | Rice | 101/23 |
| 6,278,546 B1 * | 8/2001 | Dubin et al. | 359/452 |
| 7,824,516 B2 * | 11/2010 | Amos et al. | 156/247 |
| 2008/0024902 A1 * | 1/2008 | Slafer | 360/72.1 |
| 2011/0149063 A1 * | 6/2011 | Dong et al. | 348/96 |

* cited by examiner

*Primary Examiner* — Gordon Stock, Jr.
(74) *Attorney, Agent, or Firm* — Morris Manning & Martin LLP; Tim Tingkang Xia, Esq.

(57) ABSTRACT

A system for alignment measurement for a rolling embossed double-sided optical film, the system comprising: a first roller with a first brightness enhancement film pattern and a first alignment pattern thereon, a second roller with a second brightness enhancement film pattern and a second alignment pattern thereon; a measuring unit for measuring diffraction patterns in the first alignment region and the second alignment region, respectively; and a control unit electrically connected to the first roller, the second roller and the measuring unit to adjust the relative position between the first roller and the second roller according to the diffraction patterns measured by the measuring unit.

28 Claims, 12 Drawing Sheets

SYSTEM FOR ALIGNMENT MEASUREMENT FOR ROLLING EMBOSSED DOUBLE-SIDED OPTICAL FILM AND METHOD THEREOF

TECHNICAL FIELD

The disclosure generally relates to a system for alignment measurement for a rolling embossed double-sided optical film and a method thereof.

BACKGROUND

Nano rolling embossing and alignment is potential for future manufacturing. Related reports have been published in journals. Due to considerable optical power consumption in the liquid crystal display structure with efficiency of only 3%-6%. For the most power consumptive films such as polarizer films (60% of loss), color filters (70% of loss) and the aperture ratio issue (30% of loss), nano structured films has been reported using beam splitting by diffractive optical films to overcome the aforesaid issues concerning high power consumption and low efficiency. As shown in FIG. 1, the light from a light source 10 is emitted onto a beam splitting film 12 to be converged and then is transmitted onto a dichroic filter 14 for color separation. The diffractive optical films are manufactured by rolling embossing. Even though rolling embossing is less costly with higher throughput, the manufactured products are far from satisfactory due to mismatch of double-layered microstructures during alignment. For example, angle mismatch is one of the problems resulting from rolling embossing. When angle mismatch happens, beam splitting results in poor uniformity of polarized light distribution. When there is a small angle between the top and bottom gratings, the change in diffractivity leads to poor beam splitting. As a result, the information concerning mismatch between the double-layered microstructures has to be fed back to film driving mechanism so as to achieve nano-scale alignment by repeated corrections to improve the manufacturing yield and optical efficiency of the optical films.

The beam splitter has a grating structure, which can be manufactured by hot embossing or UV embossing. As shown in FIG. 2, a top roller 22 and a bottom roller 24 are provided with blazed grating patterns 220 and 240, respectively. The microstructured patterns on the rollers 22 and 24 can be transferred onto the optical film 20, which leads to an issue of finding the mismatch and the change in diffractivity as the optical film 20 is double-sided with high-precision alignment.

U.S. Pat. No. 7,121,496 discloses a method and a system for correcting web deformation during a roll-to-roll process, which uses a computer system to control the sensors and the substrate. However, this patent fails to achieve second-scale precision on transparent materials.

As trying to realize the effects of misalignment of a double-layered film by experiments, it is found that the signals concerning the layers cannot be both obtained at the same time using microscopy and that the change in the angle between the layers cannot be identified because the thickness of the thin film is about 0.4 mm and the grating has a period of 4 μm and depth of 1 μm. To observe the surface patterns, a high-magnification objective lens is required. However, such a high-magnification objective lens exhibits a short depth of focus so that the bottom grating cannot be observed. As a result, the alignment pattern with Morie' effect cannot be achieved. On the other hand, a low-magnification objective lens exhibits a small numerical aperture. The transparent optical film exhibits low-contrast patterns. Therefore, it has become an important issue to identify and detect the pattern difference without being affected by the environmental vibration.

SUMMARY

An exemplary embodiment of a system for alignment measurement for a rolling embossed double-sided optical film for forming patterns on both sides of a substrate is disclosed, the system comprising: a roller unit, comprising: a first roller with a first brightness enhancement film pattern and a first alignment pattern thereon, and a second roller with a second brightness enhancement film pattern and a second alignment pattern thereon, wherein the first roller is positioned opposite to the second roller so that both sides of the substrate contact the first roller and the second roller respectively, the first brightness enhancement film pattern and the first alignment pattern form respectively a first brightness enhancement film region and a first alignment region on one side of the substrate and the second brightness enhancement film pattern and the second alignment pattern form respectively a second brightness enhancement film region and a second alignment region on the other side of the substrate, and the first brightness enhancement film region and the second brightness enhancement film region are opposite to each other, while the first alignment region and the second alignment region are not opposite to each other.

The system further includes a measuring unit for measuring diffraction patterns in the first alignment region and the second alignment region, respectively; and a control unit electrically connected to the roller unit and the measuring unit to adjust the relative position between the first roller and the second roller according to the diffraction patterns measured by the measuring unit.

An exemplary embodiment of a method for alignment measurement for a rolling embossed double-sided optical film for measuring patterns on both sides of a substrate is disclosed, the method comprising steps of: providing a roller unit, a measuring unit and a control unit electrically connected to the roller unit and the measuring unit, the roller unit comprising a first roller with a first brightness enhancement film pattern and a first alignment pattern thereon, and a second roller with a second brightness enhancement film pattern and a second alignment pattern thereon, wherein the first roller is positioned opposite to the second roller so that both sides of the substrate contact the first roller and the second roller respectively, the first brightness enhancement film pattern and the first alignment pattern form respectively a first brightness enhancement film region and a first alignment region on one side of the substrate and the second brightness enhancement film pattern and the second alignment pattern form respectively a second brightness enhancement film region and a second alignment region on the other side of the substrate, and the first brightness enhancement film region and the second brightness enhancement film region are opposite to each other, while the first alignment region and the second alignment region are not opposite to each other.

The method further includes steps of building up a diffractive alignment measuring model embedded in the control unit; emitting from the measuring unit a light beam onto the first alignment region and the second alignment region, respectively; measuring diffraction patterns in the first alignment region and the second alignment region, respectively, and transmitting the diffraction patterns to the control unit; and comparing the diffraction patterns in the first alignment region and the second alignment region with the diffractive alignment measuring model to decide whether the relative position between the first roller and the second roller is to be adjusted.

BRIEF DESCRIPTION OF THE DRAWINGS

The objects and spirits of various embodiments of the disclosure will be readily understood by the accompanying drawings and detailed descriptions, wherein.

DETAILED DESCRIPTION OF THE EXEMPLARY EMBODIMENT

The invention technology is being exemplified by but not limited to various embodiments as described hereinafter.

Figure 1:
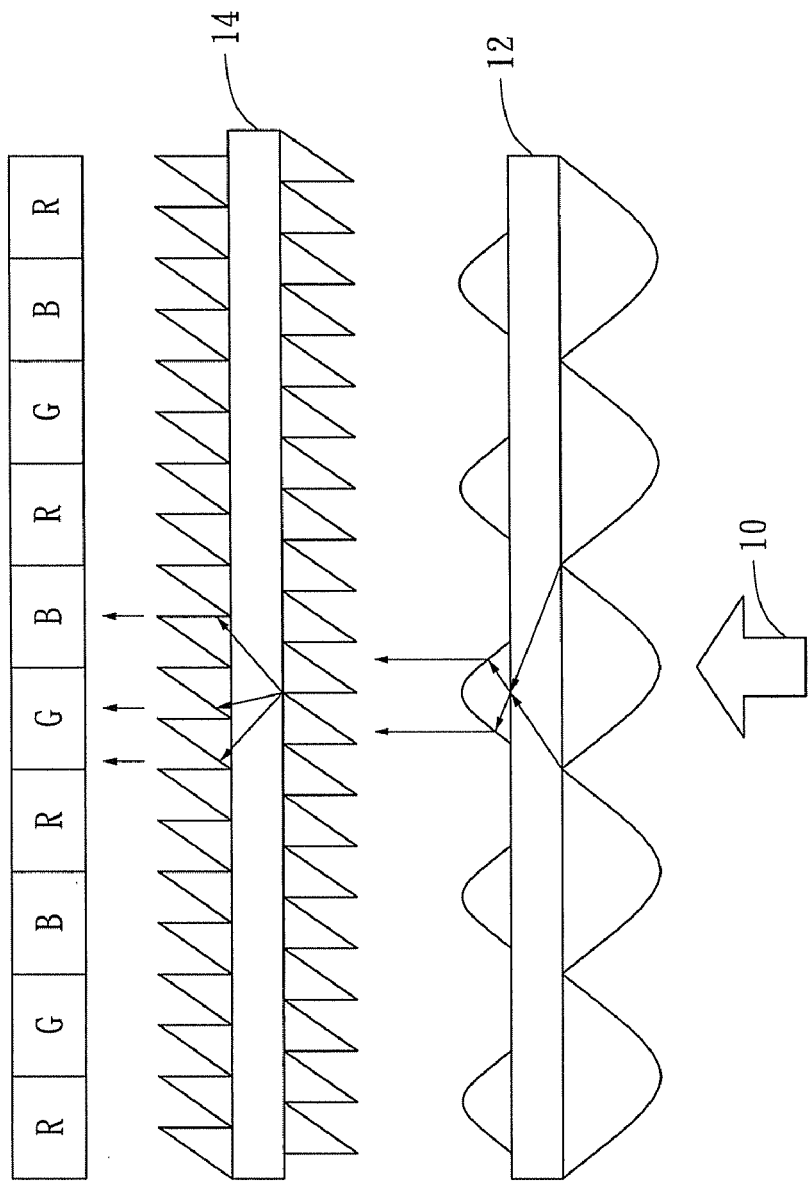
FIG. 1 is a schematic diagram showing beam splitting by a diffractive optical film.
Figure 2:
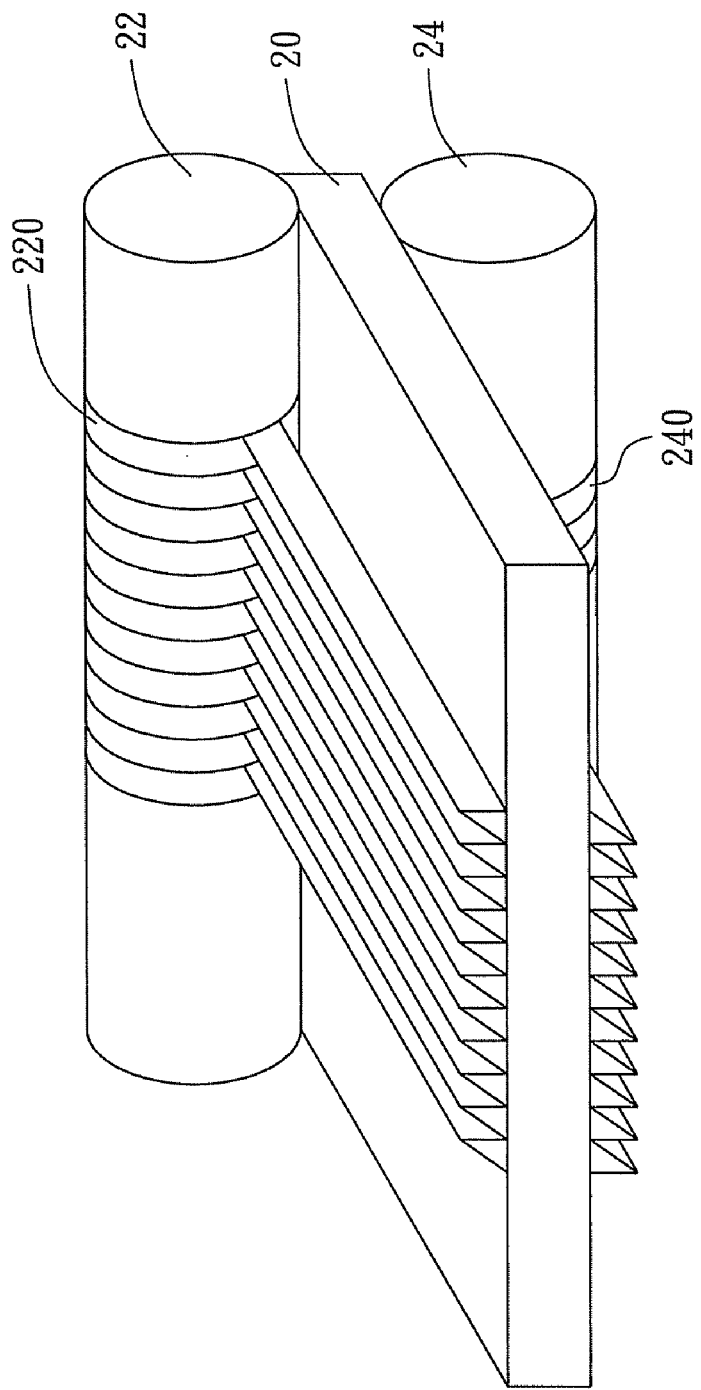
FIG. 2 is a schematic diagram showing a beam splitter manufactured by rolling embossing.
Figure 3:
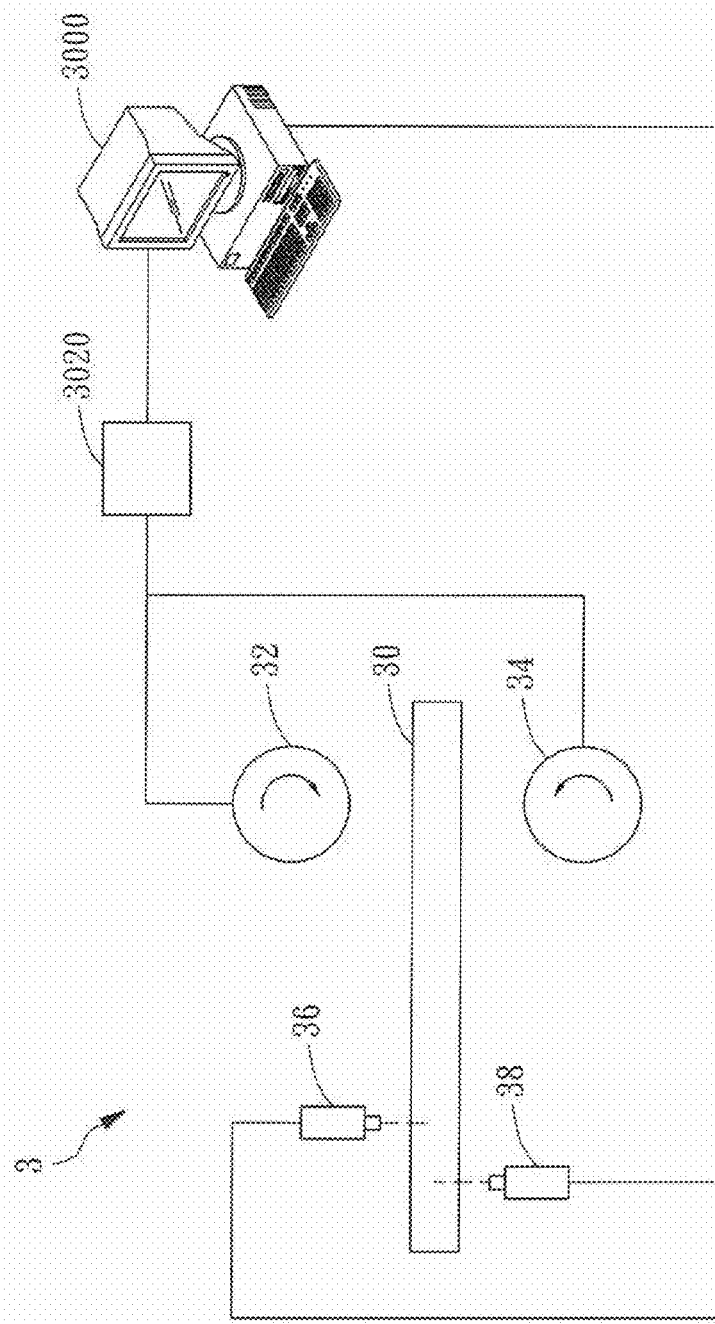
FIG. 3 is a schematic diagram showing a system for alignment measurement for a rolling embossed double-sided optical film according to an exemplary embodiment.

FIG. 3 is a schematic diagram showing a system for alignment measurement for a rolling embossed double-sided optical film according to an exemplary embodiment. The system 3 for forming patterns on both sides of a substrate 30 comprises: a roller unit comprising a first roller 32 and a second roller 34, two measuring units 36 and 38 and a control unit 3000. The first roller 32 and the second roller 34 are electrically connected to the control unit 3000 by way of a driver 3020. The measuring unit 36 and the measuring unit 38 are also electrically connected to the control unit 3000. The first roller 32 and the second roller 34 are used to manufacture the microstructured patterns (not shown, but will be described later) on both sides of the substrate 30 by rolling embossing. The measuring unit 36 and the measuring unit 38 are capable of measuring the microstructured patterns, respectively, on both sides of the substrate 30 and transmitting the information concerning the microstructured patterns to the control unit 3000. The control unit 3000 compares the information measured by the measuring unit 36 and the measuring unit 38 with the expected information and adjusts the relative position between the first roller 32 and the second roller 34 by way of the driver 3020.

Figure 4:
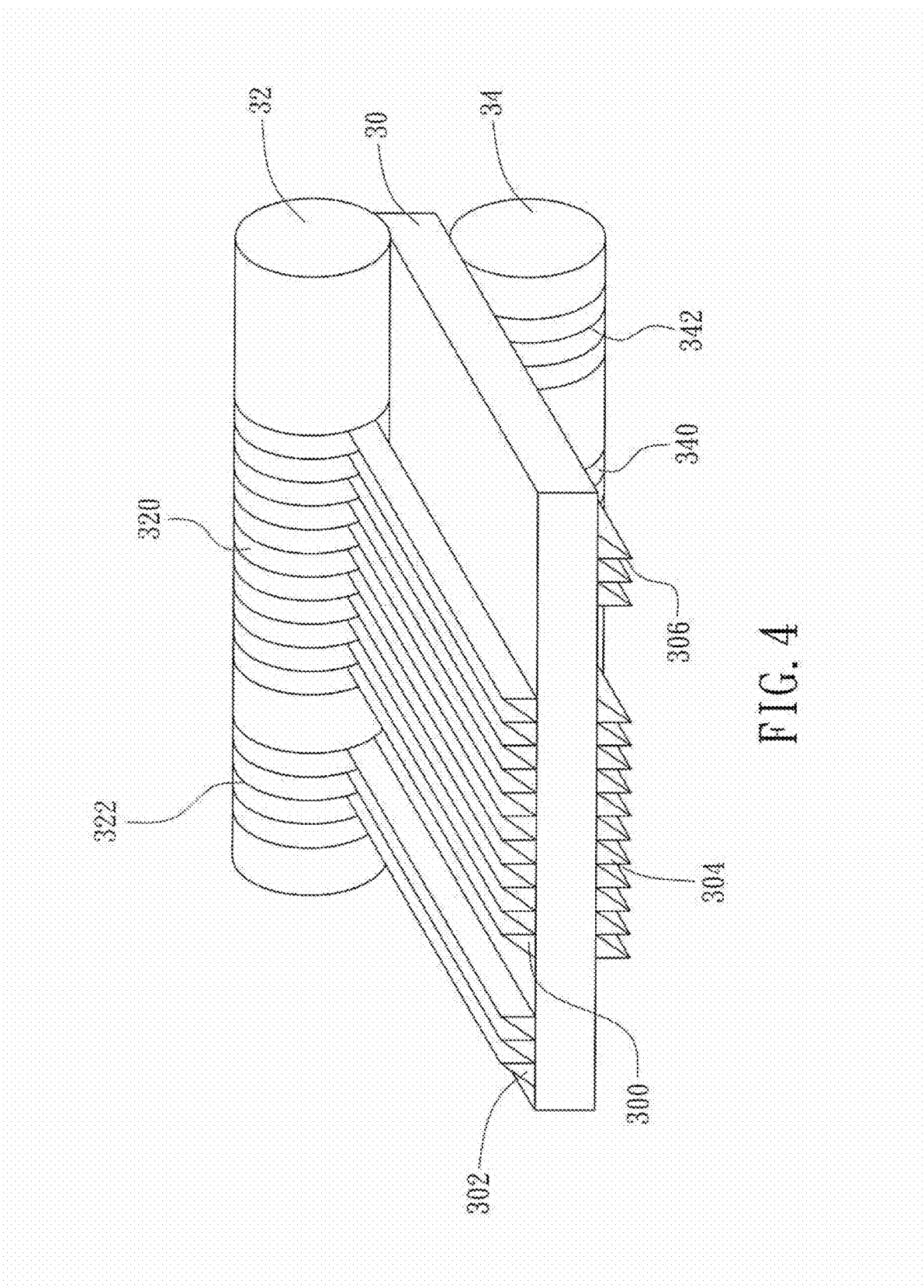
FIG. 4 is a schematic diagram showing a beam splitter manufactured by rolling embossing according to an exemplary embodiment.

FIG. 4 is a schematic diagram showing a beam splitter manufactured by rolling embossing according to an exemplary embodiment. The first roller 32 is provided with a first brightness enhancement film pattern 320 and a first alignment pattern 322 thereon. The second roller 34 is provided with a second brightness enhancement film pattern 340 and a second alignment pattern 342. The first roller 32 is disposed opposite to the second roller 34. Therefore, during rolling embossing, both sides of the substrate 30 contact the first roller 32 and the second roller 34, respectively. The first brightness enhancement film pattern 320 is transferred onto one side of the substrate 30 to form a first brightness enhancement film region 300. The first alignment pattern 322 is transferred onto the substrate 30 to form a first alignment region 302. Similarly, the second brightness enhancement film pattern 340 is transferred onto the other side of the substrate 30 to form a second brightness enhancement film region 304. The second alignment pattern 342 is transferred onto the substrate 30 to form a second alignment region 306. The first brightness enhancement film region 300 and the second brightness enhancement film region 304 are opposite to each other. The first alignment region 302 and the second alignment region 306 are not opposite to each other, which is helpful for following measurement.

Figure 5:
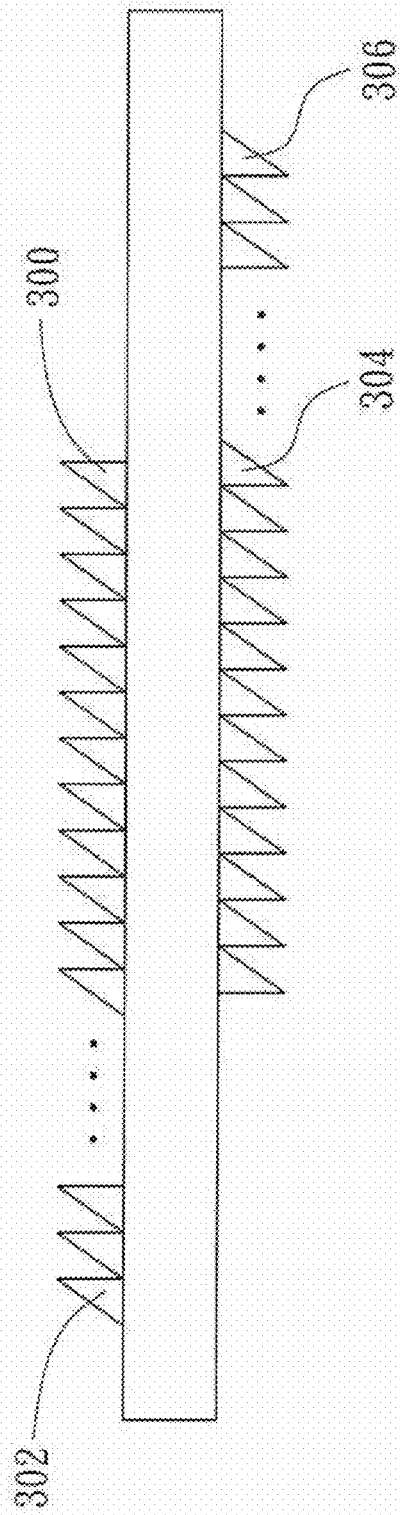
FIG. 5 is a schematic diagram showing a brightness enhancement film region and an alignment region of an optical film according to an exemplary embodiment.
Figure 6:
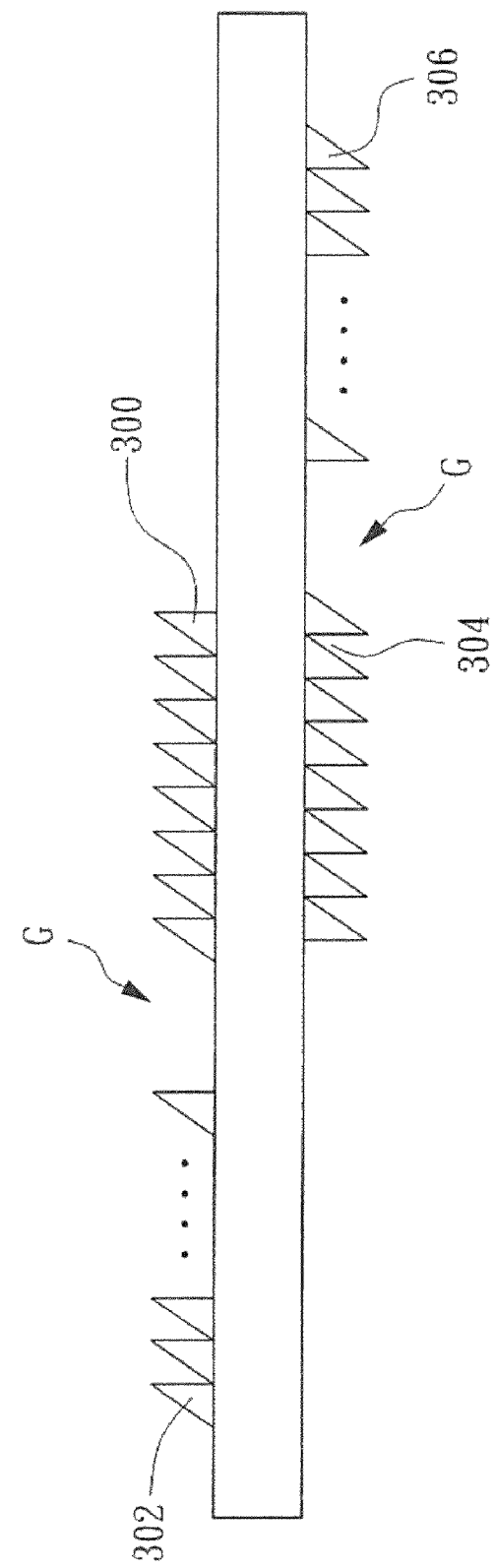
FIG. 6 is a schematic diagram showing a brightness enhancement film region and an alignment region of an optical film according to an exemplary embodiment.

The brightness enhancement film region and the alignment region can be either adjacent or separated, as shown in FIG. 5 and FIG. 6. In FIG. 5, the first brightness enhancement film region 300 and first alignment region 302 have the same pattern and are adjacent to each other. Similarly, the second brightness enhancement film region 304 and the second alignment region 306 have the same pattern and are adjacent to each other. Alternatively, in FIG. 6, the first brightness enhancement film region 300 and the first alignment region 302 have the same pattern and are not adjacent to each other. The first brightness enhancement film region 300 and the first alignment region 30 are separated by a distance G. Similarly, the second brightness enhancement film region 304 and the second alignment region 306 have the same pattern and are separated by a distance G.

Figure 7:
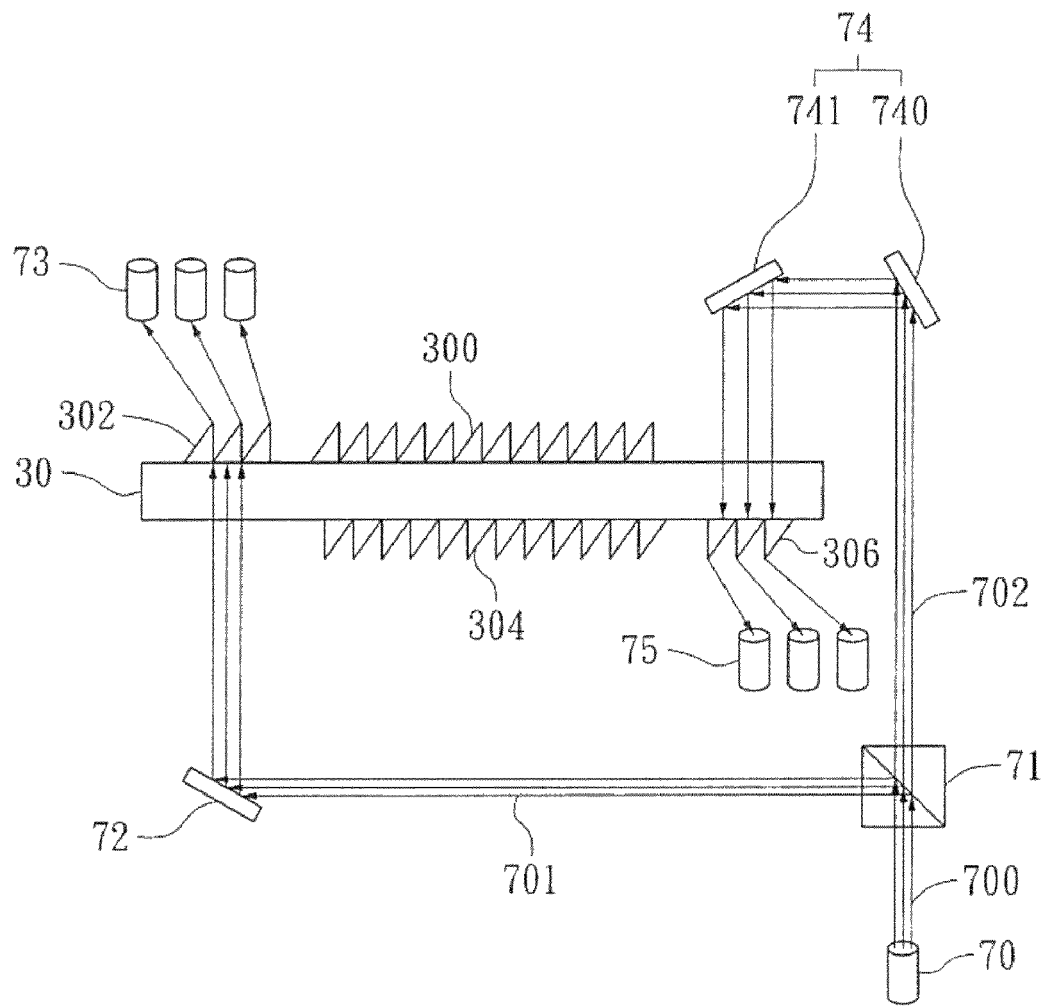
FIG. 7 is a schematic diagram showing a method for alignment measurement for a rolling embossed double-sided optical film according to an exemplary embodiment.

The disclosure provides an exemplary embodiment of a method for alignment measurement for a rolling embossed double-sided optical film as described herein. Referring to FIG. 7, the measuring unit comprises a modulation light source 70, a semi-reflector 71, a first reflector set 72, a first measuring element 73, a second reflector set 74 and a second measuring element 75. The semi-reflector 71 is capable of splitting a light beam 700 emitted from the modulation light source 70 into a first light beam 701 and a second light beam 702. The first light beam 701 is reflected by the first reflector set 72 to vertically pass through the substrate 30 and the first alignment region 302 in order. Then, the first measuring element 73 measures a diffraction pattern after the first light beam 701 passes through the first alignment region 302. Similarly, the second light beam 702 is reflected by the second reflector set 74 (comprising a reflector 740 and a reflector 741) to vertically pass through the substrate 30 and the second alignment region 306. Then, the second measuring element 75 measures a diffraction pattern after the second light beam 702 passes through the second alignment region 306. The diffraction pattern measured by the first measuring element 73 and the diffraction pattern measured by the second measuring element 75 are compared with expected diffraction patterns stored in the host so as to decide whether the relative position between the first roller 32 and the second roller 34 is correct. If the relative position is decided to be incorrect, an adjusting process will be performed.

Figure 8:
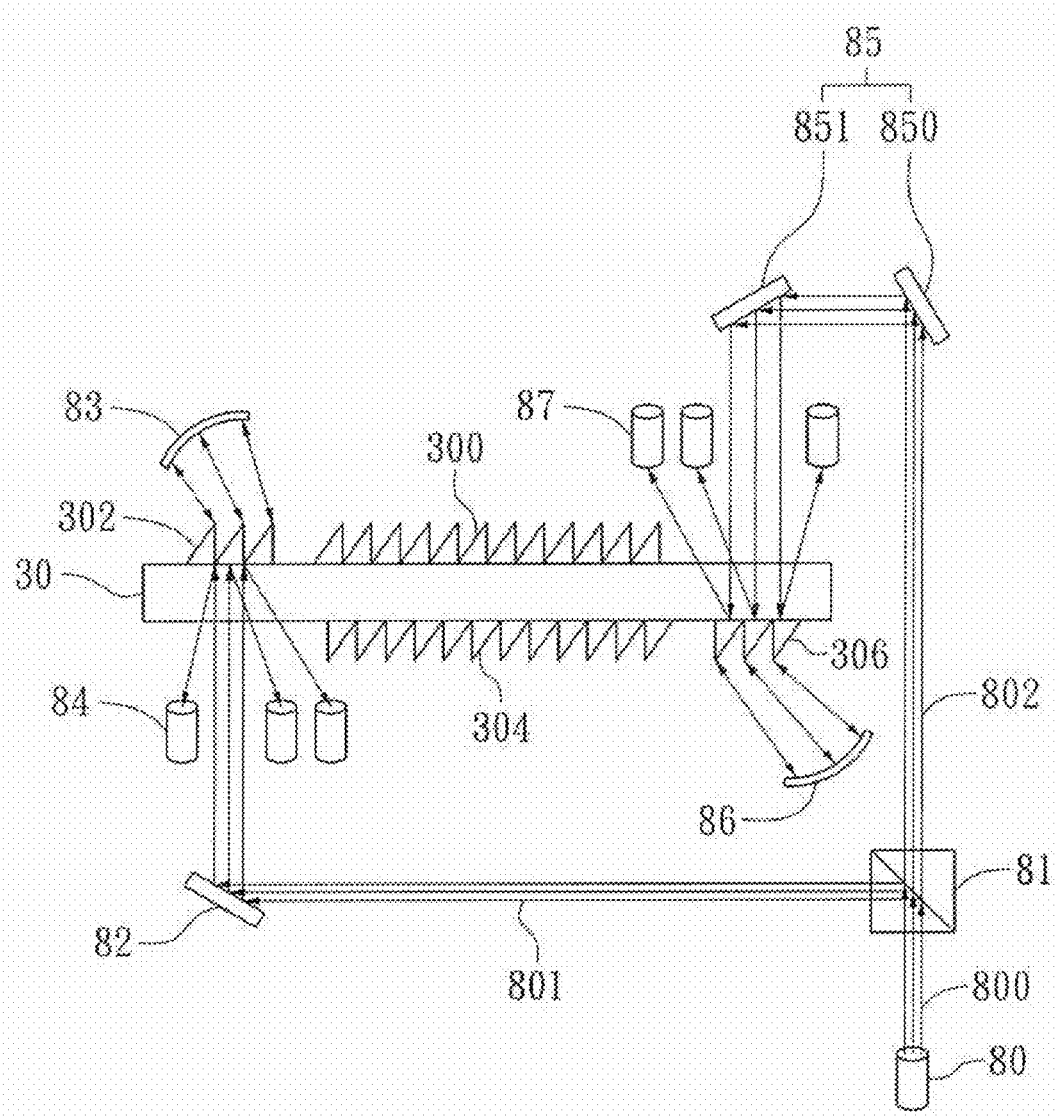
FIG. 8 is a schematic diagram showing a method for alignment measurement for a rolling embossed double-sided optical film according to an exemplary embodiment.

Referring to FIG. 8, the measuring unit comprises a modulation light source 80, a semi-reflector 81, a first reflector set 82, a first reflecting mirror 83, a first measuring element 84, a second reflector set 85, a second reflecting mirror 86 and a second measuring element 87. The semi-reflector 81 is capable of splitting a light beam 800 emitted from the modulation light source 80 into a first light beam 801 and a second light beam 802. The first light beam 801 is reflected by the first reflector set 82 to vertically pass through the substrate 30 and the first alignment region 302 in order. The first light beam 801 passing through the first alignment region 302 is further reflected by the first reflecting mirror 83 to pass through the first alignment region 302 and the substrate 30. The first measuring element 84 measures a diffraction pattern after the first light beam 801 passes through the first alignment region 302 for a second time resulting in larger variation of angles for better measurement. Similarly, the second light beam 802 is reflected by the second reflector set 85 (comprising a reflector 850 and a reflector 851) to vertically pass through the substrate 30 and the second alignment region 306. The second light beam 802 passing through the second alignment region 306 is reflected by the second reflecting mirror 86 to pass through the second alignment region 306 and the substrate 30. Then, the second measuring element 87 measures a diffraction pattern after the second light beam 802 passes through the second alignment region 306 for a second time. The diffraction pattern measured by the first measuring element 84 and the diffraction pattern measured by the second measuring element 87 are compared with expected diffraction patterns stored in the host so as to decide whether the relative position between the first roller 32 and the second roller 34 is correct. If the relative position is decided to be incorrect, an adjusting process will be performed.

Figure 9:
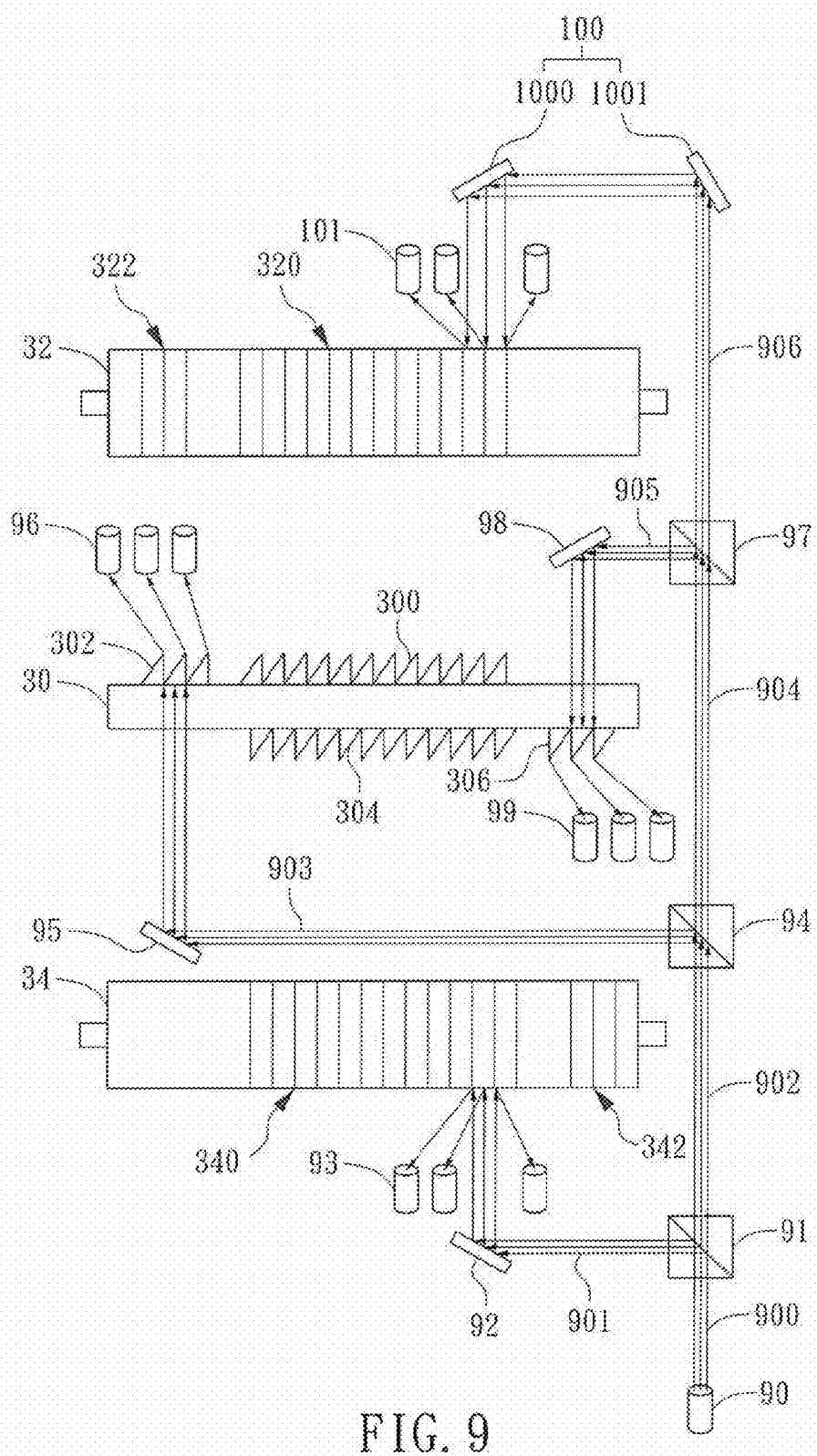
FIG. 9 is a schematic diagram showing a method for alignment measurement for a rolling embossed double-sided optical film according to an exemplary embodiment.

Referring to FIG. 9, the measuring unit comprises a modulation light source 90, a first semi-reflector 91, a first reflector set 92, a first measuring element 93, a second semi-reflector 94, a second reflector set 95, a second measuring element 96, a third semi-reflector 97, a third reflector set 98, a third measuring element 99, a fourth reflector set 100 and a fourth measuring element 101. The semi-reflector 91 is capable of splitting a light beam 900 emitted from the modulation light source 90 into a first light beam 901 and a second light beam 902. The first light beam 901 is reflected by the first reflector set 92 onto the second brightness enhancement film pattern 340 on the second roller 34. Alternatively, the first light beam 901 can also be reflected onto the second alignment pattern 342 on the second roller 34. The first measuring element 93 measures first light beam 901 reflected by the second brightness enhancement film pattern 340 (or the second alignment pattern 342). The second light beam 902 is split by the second semi-reflector 94 into a third light beam 903 and a fourth light beam 904. The third light beam 903 is reflected by the second reflector set 95 to vertically pass through the substrate 30 and the first alignment region 302 in order. Then, the second measuring element 96 measures a diffraction pattern after the third light beam 903 passes through the first alignment region 302. The fourth light beam 904 is reflected by the third semi-reflector 97 into a fifth light beam 905 and a sixth light beam 906. The fifth light beam 905 is reflected by the third reflector set 98 to vertically pass through the substrate 30 and the second alignment region 306 in order. Then, the third measuring element 99 measures a diffraction pattern after the fifth light beam 905 passes through the second alignment region 306. The sixth light beam 906 is reflected by the fourth reflector set 100 (comprising a reflector 1000 and a reflector 1001) onto the first brightness enhancement film pattern 320 on the first roller 32. Alternatively, the sixth light beam 906 can also be reflected onto the first alignment pattern 322 on the first roller 32. The fourth measuring element 101 measures the sixth light beam 906 reflected by the first brightness enhancement film pattern 320 (or the first alignment pattern 322). Since the patterns on the surface of the first roller 32 and the second roller 34 are measured in the present embodiment, it is possible to decide whether there is any deformations, damages or displacements on the rollers and whether the relative position between the first roller 32 and the second roller 34 is correct. Certainly, the diffraction pattern measured by the second measuring element 96 and the diffraction pattern measured by the third measuring element 99 are compared with expected diffraction patterns stored in the host so as to decide whether the relative position between the first roller 32 and the second roller 34 is correct. If the relative position is decided to be incorrect, an adjusting process will be performed.

Figure 10:
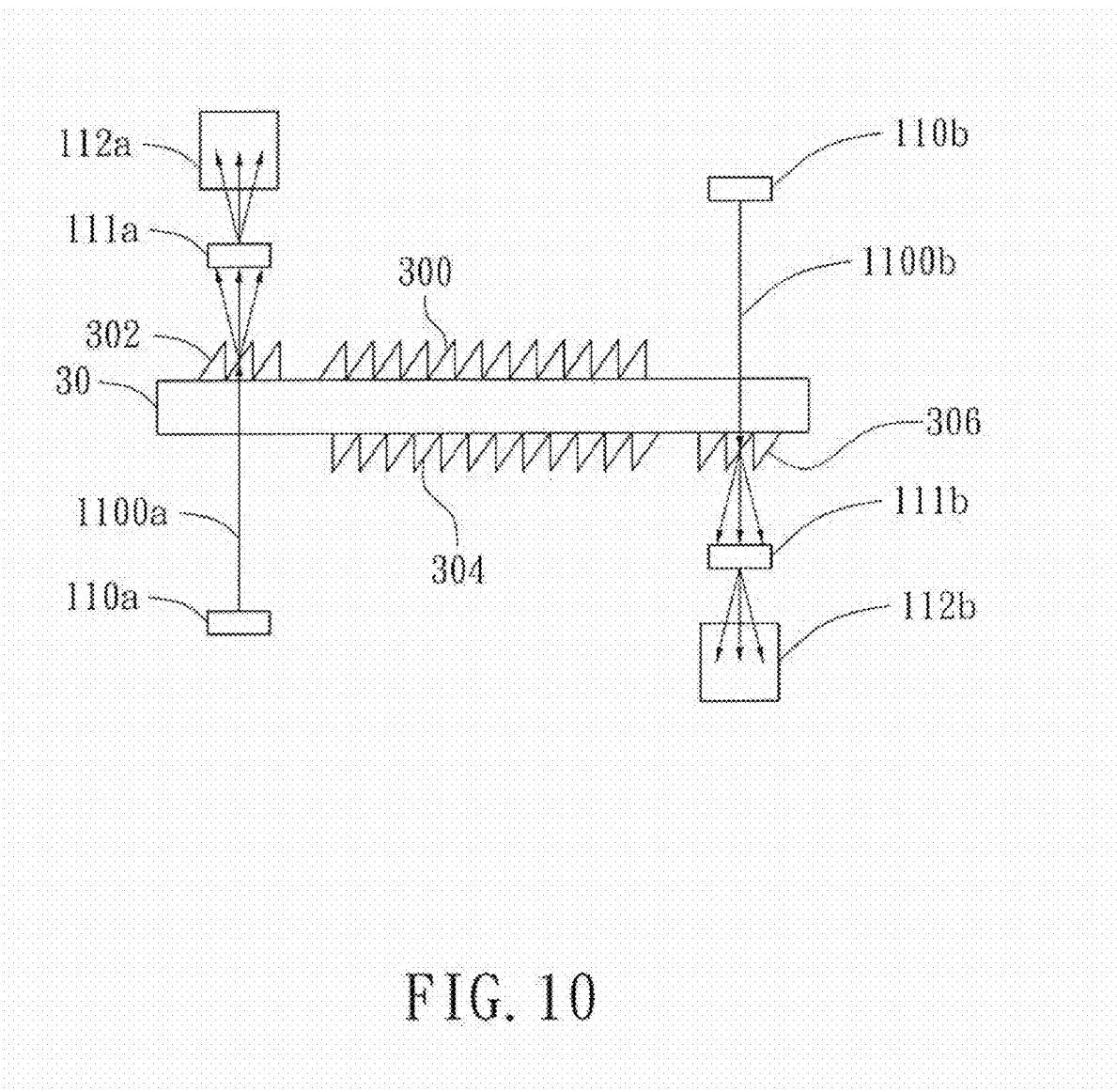
FIG. 10 is a schematic diagram showing a method for alignment measurement for a rolling embossed double-sided optical film according to an exemplary embodiment.

Referring to FIG. 10, the measuring unit comprises a first hybrid light source 110*a*, a first objective lens 111*a*, a first photo sensor 112*a*, a second hybrid light source 110*b*, a second objective lens 111*b* and a second photo sensor 112*b*. The first hybrid light source 110*a* emits a first light beam 1100*a* so that the first light beam 1100*a* passes through the substrate 30 and the first alignment region 302. Then, the first light beam 1100*a* is focused by the first objective lens 111*a* onto the first photo sensor 112*a*. The first photo sensor 112*a* measures the RGB images passing through the first alignment region 302. Similarly, the second hybrid light source 110*b* emits a second light beam 1100*b* so that the second light beam 1100*b* passes through the substrate 30 and the second alignment region 306 in order. Then, the second light beam 1100*a* is focused by the second objective lens 111*b* onto the second photo sensor 112*b*. The second photo sensor 112*b* measures the RGB images passing through the second alignment region 306. The received RGB images are processed to decide the mismatch of the angle between the first alignment region 302 and the second alignment region 306 (the top and the bottom gratings). In this embodiment, the disclosed system and method are unlimited by the depth of focus, capable of collecting higher-order optical information to decide the information concerning the angle between the double layers by image superposition and capable of analyzing the spectrum of light passing through the grating structure to obtain the signal during angle comparison.

Figure 11:
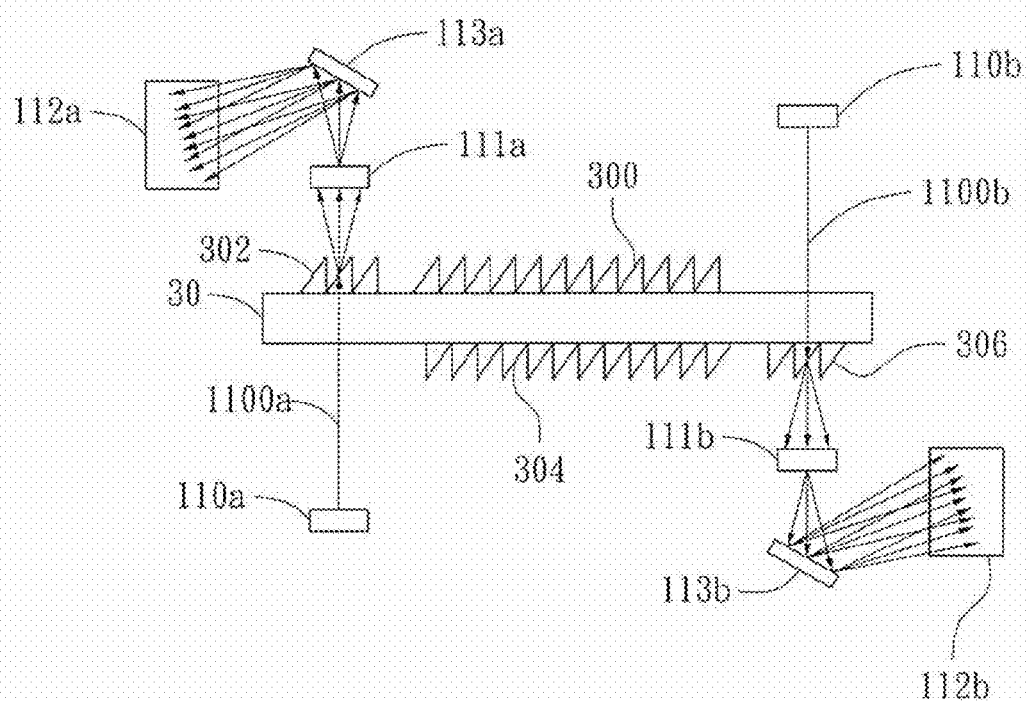
FIG. 11 is a schematic diagram showing a method for alignment measurement for a rolling embossed double-sided optical film according to an exemplary embodiment.

Referring to FIG. 11, the elements and system are similar to those in FIG. 10, and description thereof is thus not repeated. However, in FIG. 11, a first reference grating 113*a* is further provided between the first objective lens 111*a* and the first photo sensor 112*a*, and a second reference grating 113*b* is further provided between the second objective lens 111*b* and the second photo sensor 112*b*. The first reference grating 113*a* is capable of reflecting the first light beam 1100*a* focused by the first objective lens 111*a* onto the first photo sensor 112*a*, while the second reference grating 113*b* is capable of reflecting the second light beam 1100*b* focused by the second objective lens 111*b* onto the second photo sensor 112*b*. More particularly, the orientation of the first reference grating 113*a* is not parallel with the orientation of the first alignment region 302. Preferably, the orientation of the first reference grating 113*a* and the orientation of the first alignment region 302 are perpendicular. Similarly, the orientation of the second reference grating 113*b* is not parallel with the orientation of the second alignment region 306. Preferably, the orientation of the second reference grating 113*b* and the orientation of the second alignment region 306 are perpendicular. In this embodiment, the disclosed system and method are capable of collecting 2-D higher-order optical information with better contrast to decide the information concerning the angle between the double layers by image superposition and capable of analyzing the spectrum of light passing through the grating structure to obtain the signal during angle comparison.

Figure 12:
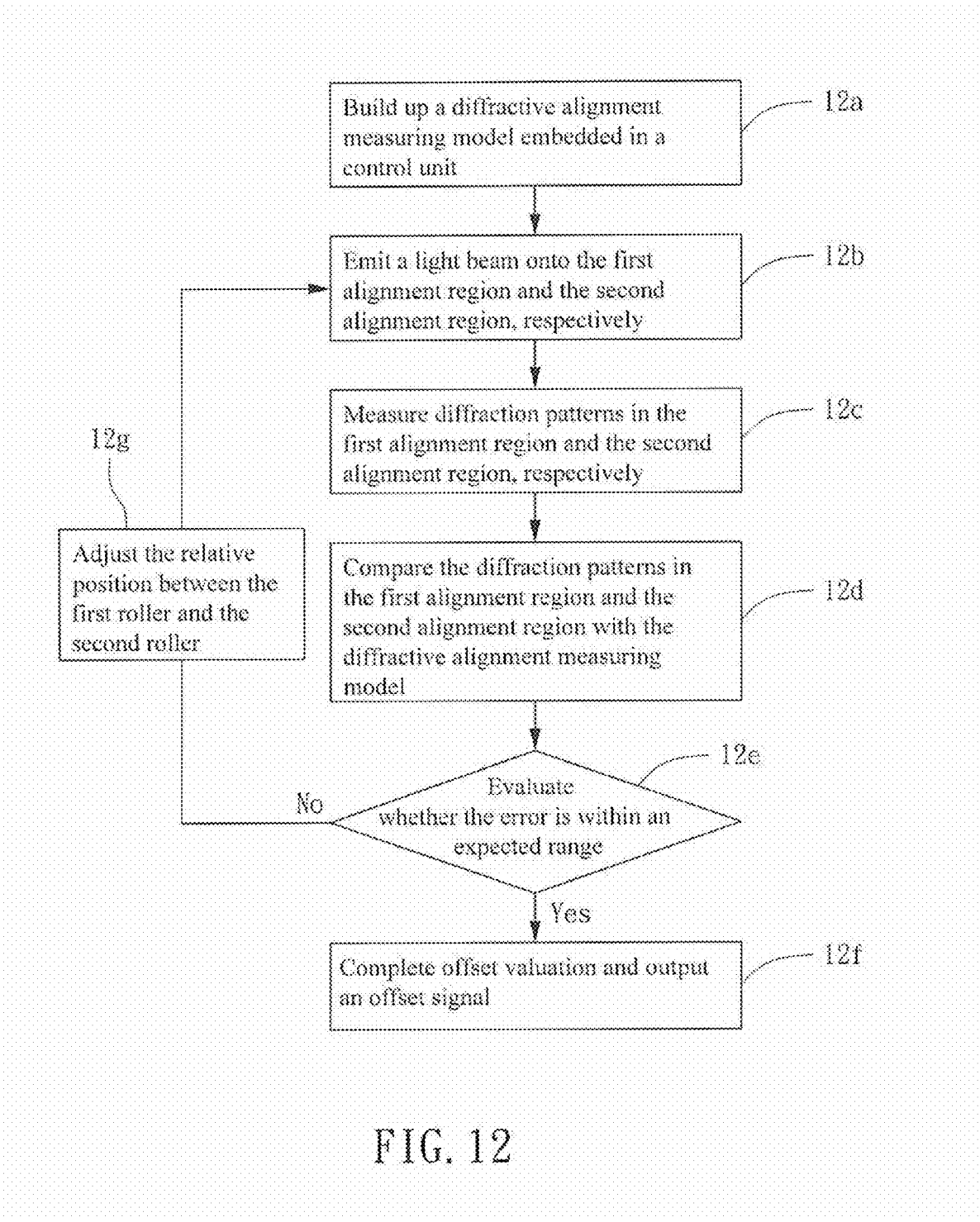
FIG. 12 is a flowchart showing the steps of a method for alignment measurement for a rolling embossed double-sided optical film according to an exemplary embodiment.

FIG. 12 is a flowchart showing the steps of a method for alignment measurement for a rolling embossed double-sided optical film according to an exemplary embodiment. These steps are described herein.

In step 12a, a diffractive alignment measuring model is embedded in a control unit. In this step, the reference size and material parameters of aligned grating patterns are input into the control unit to obtain diffraction signal response profile to establish a target function.

In step 12b, the measuring unit emits a light beam onto the first alignment region and the second alignment region, respectively.

In step 12c, the measuring unit measures diffraction patterns in the first alignment region and the second alignment region, respectively, and transmits information concerning the diffraction patterns to the control unit.

In step 12d, the control unit compares the diffraction patterns in the first alignment region and the second alignment region with the diffractive alignment measuring model.

In step 12e, the control unit evaluates whether the error is within an expected range. If yes, the process proceeds with step 12f; otherwise, the process goes to step 12g.

In step 12f, offset evaluation is completed to output an offset signal.

In step 12g, the control unit adjusts the relative position between the first roller and the second roller, and the method returns to step 12b.

According to the above discussion, it is apparent that the disclosure provides an exemplary embodiment of a system for alignment measurement for a rolling embossed double-sided optical film and a method thereof, using blazed grating to measure the designed patterns. The disclosed system and method are capable of collecting higher-order optical information to decide the information concerning the angle between the double layers by image superposition and capable of analyzing the spectrum of light passing through the grating structure to obtain the signal during angle comparison.

Although the invention has been illustrated with reference to particular embodiments, the principles involved are susceptible for use in numerous other embodiments that will be apparent to persons skilled in the art. The scope of the invention is, therefore, being indicated by the following claims and their equivalents.

What is claimed is:

1. A system for alignment measurement for a rolling embossed double-sided optical film for forming patterns on both sides of a substrate, the system comprising:
   a roller unit, comprising:
   a first roller with a first brightness enhancement film pattern and a first alignment pattern thereon, and
   a second roller with a second brightness enhancement film pattern and a second alignment pattern thereon,
   wherein the first roller is positioned opposite to the second roller so that both sides of the substrate contact the first roller and the second roller respectively, the first brightness enhancement film pattern and the first alignment pattern form respectively a first brightness enhancement film region and a first alignment region on one side of the substrate and the second brightness enhancement film pattern and the second alignment pattern form respectively a second brightness enhancement film region and a second alignment region on the other side of the substrate, and the first brightness enhancement film region and the second brightness enhancement film region are opposite to each other, while the first alignment region and the second alignment region are not opposite to each other;
   a measuring unit for measuring diffraction patterns in the first alignment region and the second alignment region, respectively; and
   a control unit electrically connected to the roller unit and the measuring unit to adjust a relative position between the first roller and the second roller according to the diffraction patterns measured by the measuring unit.

2. The system for alignment measurement for a rolling embossed double-sided optical film as recited in claim 1, wherein the first brightness enhancement film pattern comprises a plurality of adjacent linear triangular prism patterns.

3. The system for alignment measurement for a rolling embossed double-sided optical film as recited in claim 1, wherein the first alignment pattern comprises a plurality of adjacent linear triangular prism patterns.

4. The system for alignment measurement for a rolling embossed double-sided optical film as recited in claim 1, wherein the second brightness enhancement film pattern comprises a plurality of adjacent linear triangular prism patterns.

5. The system for alignment measurement for a rolling embossed double-sided optical film as recited in claim 1, wherein the second alignment pattern comprises a plurality of adjacent linear triangular prism patterns.

6. The system for alignment measurement for a rolling embossed double-sided optical film as recited in claim 1, wherein the first brightness enhancement film pattern is adjacent to the first alignment pattern.

7. The system for alignment measurement for a rolling embossed double-sided optical film as recited in claim 1, wherein the first brightness enhancement film pattern is not adjacent to the first alignment pattern.

8. The system for alignment measurement for a rolling embossed double-sided optical film as recited in claim 1, wherein the second brightness enhancement film pattern is adjacent to the second alignment pattern.

9. The system for alignment measurement for a rolling embossed double-sided optical film as recited in claim 1, wherein the second brightness enhancement film pattern is not adjacent to the second alignment pattern.

10. The system for alignment measurement for a rolling embossed double-sided optical film as recited in claim 1, wherein the measuring unit comprises:
    a modulation light source;
    a semi-reflector capable of splitting a light beam from the modulation light source into a first light beam and a second light beam;
    a first reflector set capable of reflecting the first light beam to pass through the substrate and the first alignment region;
    a first measuring element capable of measuring a diffraction pattern after the first light beam passes through the first alignment region;
    a second reflector set capable of reflecting the second light beam to pass through the substrate and the second alignment region; and a second measuring element capable of measuring a diffraction pattern after the second light beam passes through the second alignment region.

11. The system for alignment measurement for a rolling embossed double-sided optical film as recited in claim 1, wherein the measuring unit comprises:
   a modulation light source;
   a semi-reflector capable of splitting a light beam from the modulation light source into a first light beam and a second light beam;
   a first reflector set capable of reflecting the first light beam to pass through the substrate and the first alignment region;
   a first reflecting mirror capable of reflecting the first light beam passing through the first alignment region to pass through the first alignment region and the substrate;
   a first measuring element capable of measuring a second-order diffraction pattern after the first light beam passes through the substrate;
   a second reflector set capable of reflecting the second light beam to pass through the substrate and the second alignment region;
   a second reflecting mirror capable of reflecting the second light beam passing through the second alignment region to pass through the second alignment region and the substrate; and
   a second measuring element capable of measuring a second-order diffraction pattern after the second light beam passes through the substrate.

12. The system for alignment measurement for a rolling embossed double-sided optical film as recited in claim 1, wherein the measuring unit comprises:
   a modulation light source;
   a first semi-reflector capable of splitting a light beam from the modulation light source into a first light beam and a second light beam;
   a first reflector set capable of reflecting the first light beam onto the second alignment pattern on the second roller;
   a first measuring element capable of measuring the first light beam reflected by the second alignment pattern;
   a second semi-reflector capable of splitting the second light beam into a third light beam and a fourth light beam;
   a second reflector set capable of reflecting the third light beam to pass through the substrate and the first alignment region;
   a second measuring element capable of measuring a diffraction pattern after the third light beam passes through the first alignment region;
   a third semi-reflector capable of splitting the fourth light beam into a fifth light beam and a sixth light beam;
   a third reflector set capable of reflecting the fifth light beam to pass through the substrate and the second alignment region;
   a third measuring element capable of measuring a diffraction pattern after the fifth light beam passes through the second alignment region;
   a fourth reflector set capable of reflecting the sixth light beam onto the first alignment pattern on the first roller; and
   a fourth measuring element capable of measuring the sixth light beam reflected by the first alignment pattern.

13. The system for alignment measurement for a rolling embossed double-sided optical film as recited in claim 1, wherein the measuring unit comprises:
   a first hybrid light source capable of emitting a first light beam so that the first light beam passes through the substrate and the first alignment region in order;
   a first objective lens capable of focusing the first light beam passing through the first alignment region;
   a first photo sensor capable of sensing the first light beam passing through the first objective lens;
   a second hybrid light source capable of emitting a second light beam so that the second light beam passes through the substrate and the second alignment region in order;
   a second objective lens capable of focusing the second light beam passing through the second alignment region; and
   a second photo sensor capable of sensing the second light beam passing through the second objective lens.

14. The system for alignment measurement for a rolling embossed double-sided optical film as recited in claim 1, wherein the measuring unit comprises:
   a first hybrid light source capable of emitting a first light beam so that the first light beam passes through the substrate and the first alignment region in order;
   a first objective lens capable of focusing the first light beam passing through the first alignment region;
   a first reference grating capable of reflecting the first light beam focused by the first objective lens, an orientation of the first reference grating being not parallel with an orientation of the first alignment region;
   a first photo sensor capable of sensing the first light beam reflected by the first reference grating;
   a second hybrid light source capable of emitting a second light beam so that the second light beam passes through the substrate and the second alignment region in order;
   a second objective lens capable of defocusing the second light beam passing through the second alignment region;
   a second reference grating capable of reflecting the second light beam focused by the second objective lens, an orientation of the second reference grating being not parallel with an orientation of the second alignment region; and
   a second photo sensor capable of sensing the first light beam passing through the second objective lens.

15. A method for alignment measurement for a rolling embossed double-sided optical film for measuring patterns on both sides of a substrate, the method comprising steps of:
   providing a roller unit, a measuring unit and a control unit electrically connected to the roller unit and the measuring unit, the roller unit comprising a first roller with a first brightness enhancement film pattern and a first alignment pattern thereon, and a second roller with a second brightness enhancement film pattern and a second alignment pattern thereon, wherein the first roller is positioned opposite to the second roller so that both sides of the substrate contact the first roller and the second roller respectively, the first brightness enhancement film pattern and the first alignment pattern form respectively a first brightness enhancement film region and a first alignment region on one side of the substrate and the second brightness enhancement film pattern and the second alignment pattern form respectively a second brightness enhancement film region and a second alignment region on the other side of the substrate, and the first brightness enhancement film region and the second brightness enhancement film region are opposite to each other, while the first alignment region and the second alignment region are not opposite to each other;
   building up a diffractive alignment measuring model embedded in the control unit;
   emitting from the measuring unit a light beam onto the first alignment region and the second alignment region, respectively;

measuring diffraction patterns in the first alignment region and the second alignment region, respectively, and transmitting the diffraction patterns to the control unit; and comparing the diffraction patterns in the first alignment region and the second alignment region with the diffractive alignment measuring model to decide whether a relative position between the first roller and the second roller is to be adjusted.

16. The method for alignment measurement for a rolling embossed double-sided optical film as recited in claim 15, wherein the first brightness enhancement film pattern comprises a plurality of adjacent linear triangular prism patterns.

17. The method for alignment measurement for a rolling embossed double-sided optical film as recited in claim 15, wherein the first alignment pattern comprises a plurality of adjacent linear triangular prism patterns.

18. The method for alignment measurement for a rolling embossed double-sided optical film as recited in claim 15, wherein the second brightness enhancement film pattern comprises a plurality of adjacent linear triangular prism patterns.

19. The method for alignment measurement for a rolling embossed double-sided optical film as recited in claim 15, wherein the second alignment pattern comprises a plurality of adjacent linear triangular prism patterns.

20. The method for alignment measurement for a rolling embossed double-sided optical film as recited in claim 15, wherein the first brightness enhancement film pattern is adjacent to the first alignment pattern.

21. The method for alignment measurement for a rolling embossed double-sided optical film as recited in claim 15, wherein the first brightness enhancement film pattern is not adjacent to the first alignment pattern.

22. The method for alignment measurement for a rolling embossed double-sided optical film as recited in claim 15, wherein the second brightness enhancement film pattern is adjacent to the second alignment pattern.

23. The method for alignment measurement for a rolling embossed double-sided optical film as recited in claim 15, wherein the second brightness enhancement film pattern is not adjacent to the second alignment pattern.

24. The method for alignment measurement for a rolling embossed double-sided optical film as recited in claim 15, wherein the measuring unit comprises:
a modulation light source;
a semi-reflector capable of splitting a light beam from the modulation light source into a first light beam and a second light beam;
a first reflector set capable of reflecting the first light beam to pass through the substrate and the first alignment region;
a first measuring element capable of measuring a diffraction pattern after the first light beam passes through the first alignment region;
a second reflector set capable of reflecting the second light beam to pass through the substrate and the second alignment region; and
a second measuring element capable of measuring a diffraction pattern after the second light beam passes through the second alignment region.

25. The method for alignment measurement for a rolling embossed double-sided optical film as recited in claim 15, wherein the measuring unit comprises:
a modulation light source;
a semi-reflector capable of splitting a light beam from the modulation light source into a first light beam and a second light beam;
a first reflector set capable of reflecting the first light beam to pass through the substrate and the first alignment region;
a first reflecting mirror capable of reflecting the first light beam passing through the first alignment region to pass through the first alignment region and the substrate;
a first measuring element capable of measuring a second-order diffraction pattern after the first light beam passes through the substrate;
a second reflector set capable of reflecting the second light beam to pass through the substrate and the second alignment region;
a second reflecting mirror capable of reflecting the second light beam passing through the second alignment region to pass through the second alignment region and the substrate; and
a second measuring element capable of measuring a second-order diffraction pattern after the second light beam passes through the substrate.

26. The method for alignment measurement for a rolling embossed double-sided optical film as recited in claim 15, wherein the measuring unit comprises:
a modulation light source;
a first semi-reflector capable of splitting a light beam from the modulation light source into a first light beam and a second light beam;
a first reflector set capable of reflecting the first light beam onto the second alignment pattern on the second roller;
a first measuring element capable of measuring the first light beam reflected by the second alignment pattern;
a second semi-reflector capable of splitting the second light beam into a third light beam and a fourth light beam;
a second reflector set capable of reflecting the third light beam to pass through the substrate and the first alignment region;
a second measuring element capable of measuring a diffraction pattern after the third light beam passes through the first alignment region;
a third semi-reflector capable of splitting the fourth light beam into a fifth light beam and a sixth light beam;
a third reflector set capable of reflecting the fifth light beam to pass through the substrate and the second alignment region;
a third measuring element capable of measuring a diffraction pattern after the fifth light beam passes through the second alignment region;
a fourth reflector set capable of reflecting the sixth light beam onto the first alignment pattern on the first roller; and
a fourth measuring element capable of measuring the sixth light beam reflected by the first alignment pattern.

27. The method for alignment measurement for a rolling embossed double-sided optical film as recited in claim 15, wherein the measuring unit comprises:
a first hybrid light source capable of emitting a first light beam so that the first light beam passes through the substrate and the first alignment region in order;
a first objective lens capable of focusing the first light beam passing through the first alignment region;
a first photo sensor capable of sensing the first light beam passing through the first objective lens;
a second hybrid light source capable of emitting a second light beam so that the second light beam passes through the substrate and the second alignment region in order;

a second objective lens capable of focusing the second light beam passing through the second alignment region; and a second photo sensor capable of sensing the second light beam passing through the second objective lens.

28. The method for alignment measurement for a rolling embossed double-sided optical film as recited in claim 15, wherein the measuring unit comprises:

a first hybrid light source capable of emitting a first light beam so that the first light beam passes through the substrate and the first alignment region in order;

a first objective lens capable of focusing the first light beam passing through the first alignment region;

a first reference grating capable of reflecting the first light beam focused by the first objective lens, an orientation of the first reference grating being not parallel with an orientation of the first alignment region;

a first photo sensor capable of sensing the first light beam reflected by the first reference grating;

a second hybrid light source capable of emitting a second light beam so that the second light beam passes through the substrate and the second alignment region in order;

a second objective lens capable of defocusing the second light beam passing through the second alignment region;

a second reference grating capable of reflecting the second light beam focused by the second objective lens, an orientation of the second reference grating being not parallel with an orientation of the second alignment region; and a second photo sensor capable of sensing the first light beam passing through the second objective lens.

* * * * *